(No Model.)
S. LANGFORD.
CULTIVATOR SHOVEL.
No. 324,850. Patented Aug. 25, 1885.
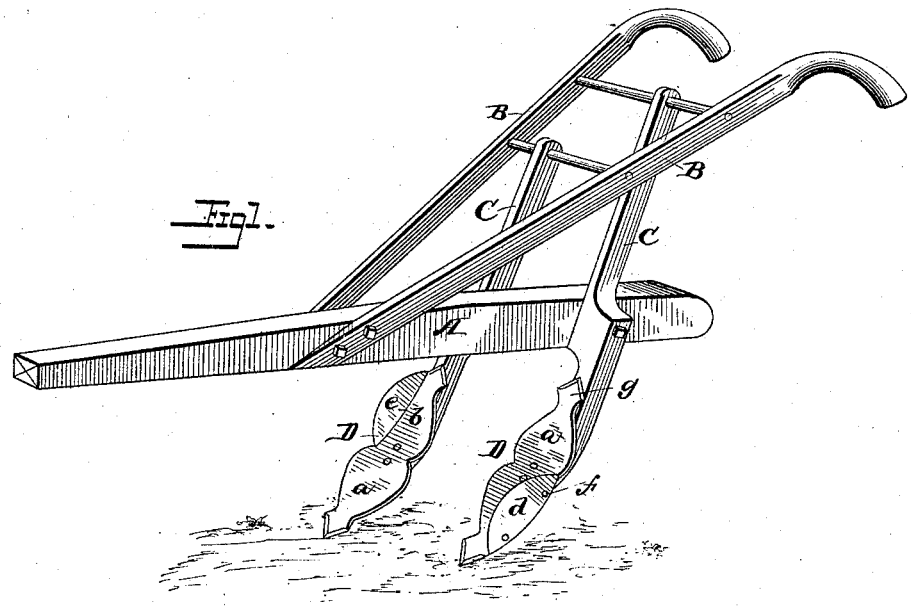
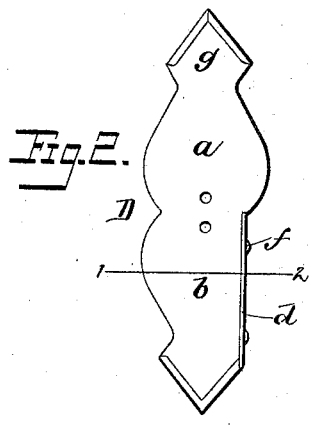
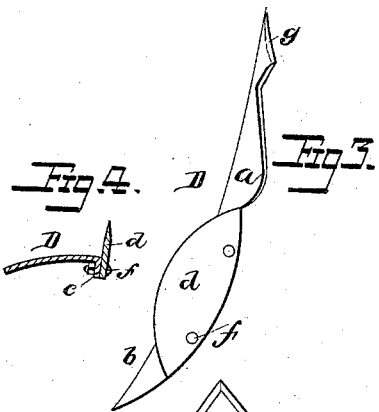
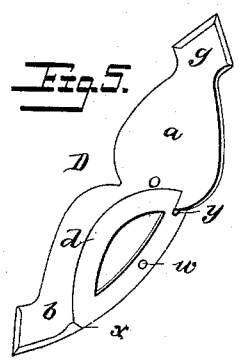
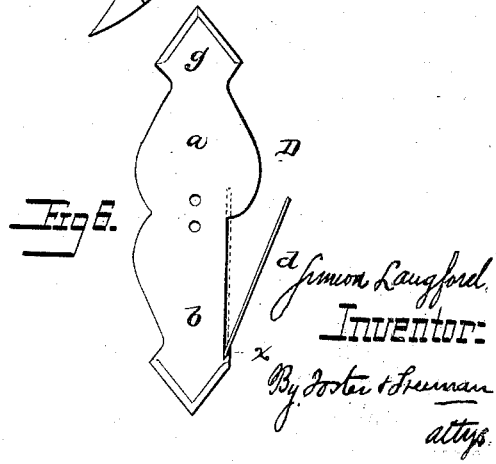
Attests:
John G. Hinkel Jr.
Wm. F. Sayers.
Simeon Langford,
Inventor:
By Foster & Freeman
attys.

UNITED STATES PATENT OFFICE.

SIMEON LANGFORD, OF CYNTHIANA, INDIANA.

CULTIVATOR-SHOVEL.

SPECIFICATION forming part of Letters Patent No. 324,850, dated August 25, 1885.

Application filed June 25, 1885. (No model.)

*To all whom it may concern:*

Be it known that I, SIMEON LANGFORD, a citizen of the United States, and a resident of Cynthiana, in the county of Posey and State of Indiana, have invented certain new and useful Improvements in Cultivator-Shovels, of which the following is a specification.

My invention is a cultivator-blade constructed, as hereinafter set forth, so as to penetrate the ground with less draft than blades of the ordinary construction, turn the blades readily to one side of the furrow, and to operate effectively as a cutter when reversed.

In the drawings, Figure 1 is a perspective view of a cultivator provided with my improved blades. Fig. 2 is a face view of one of the blades. Fig. 3 is a side view. Fig. 4 is a section on the line 1 2, Fig. 2. Figs. 5 and 6 are views showing a modification.

A is the beam. B B are the handles, and C C are the standards, of the plow, which parts may be of any of the usual constructions and arrangement, as my invention relates to the form of the blade D.

Each blade is shown as double-ended or reversible, one end, $a$, being a shovel, the other end, $b$, being a half-shovel—that is, one side being cut away to form a straight edge—to which is connected a cutter-blade, $d$, either a solid plate, as in Figs. 1 to 4, or open, as in Fig. 5.

One mode of forming the shovel and connecting the blade D is to turn back one side of the portion $b$ to form a flange, $e$, to which the cutter-blade $d$ is secured by bolts $f$, as best shown in Fig. 4. Another mode is to form a notch, $x$, at the side of the blade near the end, adapted to the end of the blade $d$, and to form a slot, $y$, in the latter to receive a part of the shovel, a bolt or arch, $w$, securing the blade $d$ in place.

The shovel end $a$ of each blade terminates in the form of an arrow-head, $g$, and the portion above is widened and curved transversely so as to act somewhat in the nature of a mold-board to turn the earth to one side away from the furrow better than the ordinary shovels having flat faces, while the narrow arrow-headed end readily penetrates the ground, and will pass through the earth with less draft than shovels of the ordinary construction.

When the end $b$ of the shovel is brought into use, the cutter operates effectively in the ordinary manner.

The cutter may at any time be readily sharpened, either by removing the shovel-blade D from the standard and applying the cutter to the stone, or the cutter-blade $d$ may be unbolted from the shovel-blade without detaching the latter.

It will be seen that the blades D may be readily reversed on the standards at any time to bring either end into operative position.

Without limiting myself to the precise construction and arrangement of parts shown, I claim—

1. A double-ended reversible blade for cultivators, with arrow-shaped points widened and curved toward the center, one portion of the said blade being cut away at one side and provided with a cutter-plate, $d$, substantially as and for the purpose set forth.

2. A double-ended reversible cultivator-blade provided with arrow-shaped points widened above said points, straight at one side, and provided with a cutter-blade, substantially as set forth.

3. A doubled-ended reversible cultivator-blade having a notch, $x$, near one end, in combination with a detachable blade, $d$, adapted at one end to the notch, having a slot, $y$, at the other, and bolted to the cultivator-blade, substantially as described.

In testimony whereof I have signed my name to this specification in the presence of two subscribing witnesses.

SIMEON LANGFORD.

Witnesses:
JOSEPH L. BLASE,
C. RIESTER, Jr.